United States Patent Office 3,350,192
Patented Oct. 31, 1967

3,350,192
METHOD FOR PRE-EMERGENCE CONTROL OF UNDESIRABLE PLANT LIFE
Sidney B. Richter, Chicago, Ill., assignor to Velsicol Chemical Corporation, Chicago, Ill., a corporation of Illinois
No Drawing. Filed Dec. 11, 1963, Ser. No. 329,893
10 Claims. (Cl. 71—87)

ABSTRACT OF THE DISCLOSURE

A method for the pre-emergence control of undesirable plant life which comprises applying to soil a herbicidal composition comprising an inert carrier and as the essential active ingredient, in a quantity which is herbicidally injurious to said undesirable plant life, a compound of the formula

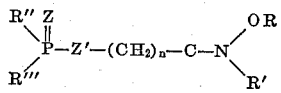

wherein R and R' are independently alkyl or acyl, n is an integer from 1 to 3, Z and Z' are independently oxygen or sulfur, and R" and R''' are independently alkyl, cycloalkyl, alkoxy, cycloalkoxy, alkylthio, aryl, aryloxy, arylthio, aralkyl, aralkoxy or aralkylthio.

---

This invention relates to the control of undesirable plant life. More specifically, this invention relates to the preemergence control of undesirable plant life.

It has now been found that undesirable plant life can be controlled very effectively with the use of chemical compounds of the formula

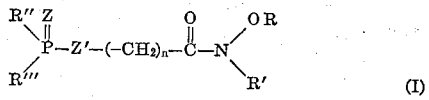
(I)

wherein R and R' are independently selected from the group consisting of alkyl and acyl groups containing from one to ten carbon atoms; n is an integer from 1 to 3, and preferably is 1; Z and Z' are independently selected from the group consisting of oxygen and sulfur; and R" and R''' are independently selected from the group consisting of alkyl, cycloalkyl, alkoxy, cycloalkoxy, alkylthio, aryl, aryloxy, arylthio, aralkyl, aralkoxy and aralkylthio groups containing from one to eighteen carbon atoms. In a preferred embodiment of this invention the method of the present invention concerns controlling undesirable plant life with compounds of the Formula I, wherein R and R' are independently selected from the group consisting of alkyl groups containing from one to ten carbon atoms; n is 1; Z and Z' are independently selected from the group consisting of oxygen and sulfur, and R" and R''' are independently selected from the group consisting of alkyl, cycloalkyl, alkoxy, cycloalkoxy, alkylthio, aryl, aryloxy, arylthio, aralkyl, aralkoxy and aralkylthio groups containing from one to eighteen carbon atoms. In a still more preferred embodiment of this invention, the method of this invention concerns controlling weeds by applying to soil compounds of Formula I wherein R and R' are alkyl radicals containing from one to ten carbon atoms, provided that a minimum of one of R and R' contains at least two carbon atoms, and more preferably contains at least three carbon atoms; n is 1; Z and Z' are sulfur; and R" and R''' are selected from the group consisting of alkoxy and cycloalkoxy groups containing from one to ten carbon atoms.

The compounds utilized in the method of this invention can be prepared conveniently by the reaction of the appropriate haloalkyl amide with an alkali metal salt of a suitable phosphorus acid as described, for example, in U.S. Patent 3,092,541 granted June 4, 1963. These new compounds can be prepared readily from the corresponding appropriately substituted haloalkyl amide by reacting at its halogen substitution with an alkali metal salt of a phosphorus acid of the formula HZ'P(Z)(R")(R''') wherein Z', Z, R" and R''' are as described above. The substituted haloalkyl amide described above can be prepared from its corresponding acid halide by treatment with an amine of the formula HN(OR)(R') wherein R and R' are as described above.

Many of the haloalkyl acid halides are known to the art and are commercially available. Exemplary of the suitable haloalkyl acid halides are α-chloroacetyl chloride and β-bromopropionyl chloride.

The amines which can be reacted with the haloalkyl acid chloride to form the haloalkyl amide are those having the formula HNR'(OR) wherein R and R' are as heretofore described. Many of these amines are known to the art. Typical of such amines are: N-methoxy-N-methylamine, N-ethoxy - N - methylamine, N-ethoxy-N-ethylamine, N-methoxy - N - ethylamine, N-propoxy-N-methylamine, N-propoxy - N - ethylamine, N-propoxy-N-propylamine, N-methoxy-N-propylamine, N-butoxy-N-butylamine, N-butoxy-N-methylamine, N - methoxy-N-butylamine, N-pentyloxy-N-ethylamine, N-nonyloxy-N-methylamine, N-decyloxy-N-propylamine, N-methoxy-N-decylamine, N-acetoxy-N-methylamine, N-methoxy-N-acetylamine and N-methoxy-N-propionylamine. Other appropriately substituted amines can be obtained for example by the method described by Jones and Major J. Am. Chem. Soc. vol. 52, pp. 669–79 (1930).

The phosphorus acids of which the alkali metal salts thereof can be used as reactants in the preparation of the compounds of the present invention, have the formula

(II)

wherein Z', Z, R" and R''' are as heretofore described. These acids fall into various groups depending on the identity of Z, Z', R" and R'''. Thus when Z and Z' are both oxygen and R" and R''' are alkyl or aryl groups, the acid is herein called a secondary phosphonic acid. Among the suitable secondary phosphonic acids are: dimethylphosphonic acid, diethylphosphonic acid, dipropylphosphonic acid, dibutylphosphonic acid, diisobutylphosphonic acid, diisoamylphosphonic acid, methylethylphosphonic acid, dibenzylphosphonic acid, methylphenylphosphonic acid, ethylphenylphosphonic acid, di-(2,4,5-trimethylphenyl) phosphonic acid, and the like. Similarly when Z' is oxygen, Z is sulfur, and R" and R''' are alkyl or aryl, the acids are herein referred to as secondary thionophosphonic acids, while when Z' is sulfur and Z is oxygen, the acids will be named thiophosphonic acids; examples of which are: diethylthiono phosphonic acid, ethylphenylthionophosphonic acid, phenylbenzylthionophosphonic acid, dibenzylthionophosphonic acid, and the like. In the same manner, when Z and Z' are both sudfur and R" and R''' are alkyl or aryl, the acids will hereinafter be called dithiophosphonic acids. Examples of these latter acids are: dimethyldithiophosphonic acid, diethyldithiophosphonic acid, diisopropyldithiophosphonic acid, diisobutyldithiophosphonic acid, dicyclohexyldithiophosphonic acid, diphenyldithiophosphonic acid, and the like.

While compounds of Formula II are herein generically termed "phosphorus acids," when R" and R''' are alkoxy or aryloxy, and Z and Z' are both oxygen, the compounds will be called secondary phosphates. Among the phosphates of Formula II, the alkali metal salts of which are suitable for use in the preparation of the compounds of this invention are: dimethyl phosphate, diethyl phosphate, dipropyl phosphate, ethyl benzyl phosphate, isoamyl benzyl phosphate, dibenzyl phosphate, ethyl phenyl phosphate, diphenyl phosphate, phenyl p-tolyl phosphate, and the like. Similarly, when Z' is sulfur and Z is oxygen the phosphorus compounds are called O,O-dialkyl or O,O-diaryl thiophosphates, while when both Z and Z' are sulfur, these compounds will be generically termed secondary O,O-dialkyl or O,O-diaryl dithiophosphates. Examples of these compounds are: O,O-dimethyl thiophosphate, O,O-dimethyl dithiophosphate, O,O-diethyl thiophosphate, O,O-diethyl dithiophosphate, O,O-dipropyl thiophosphate, O,O-diisopropyl thiophosphate, O,O-dibutyl thiophosphate, O,O-dibutyl dithiophosphate, O-ethyl-O-isobutyl thiophosphate, O,O-diisobutyl thiophosphate, O,O-diisoamyl thiophosphate, O-methyl-O-phenyl dithiophosphate, O,O-diphenyl thiophosphate, O,O-diphenyl dithiophosphate, O,O-di-(2-tolyl) dithiophosphate, and O,O-di-(4-tolyl) dithiophosphate.

R'' and R''' can also be alkylthio and arylthio groups. In such cases when Z and Z' are both oxygen in Formula II the phosphorus compounds will be termed S,S-dialkyl thio and S,S-diarylthio phosphates; when Z' is sulfur and Z is oxygen, S,S-dialkylthio thiophosphates; when Z is sulfur and Z' is oxygen; S,S-dialkylthio thionophosphate; and when Z and Z' are both sulfur, S,S-dialkylthio dithiophosphates, or S,S-dialkyl tetrathiophosphates. In illustration thereof, a suitable dialkylthio thiophosphate is

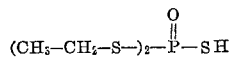

hereinafter called S,S-diethylthio thiophosphate. Furthermore, one or R'' and R''' may be alkylthio or arylthio, while the other is alkyl, alkoxy, aryl or aryloxy. In such a case, the two radicals will be identified by position i.e. S- or O-, or by radical e.g. methoxy, if it is structurally similar to phosphonic acid, thiophosphonic acid or dithiophosphonic acid. For example, the suitable alkylthio alkoxy thiophosphate

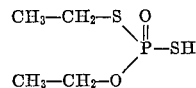

will be termed O-S-diethyl thiophosphate.

More particularly, the compounds utilized in the method of the present invention can be prepared by the reaction of the haloalkyl amide with the alkali metal salt of the phosphorus acid. This reaction readily takes place by contacting an excess above the molecularly equivalent quantity of the alkali metal salt of the phosphorus acid with the haloalkyl amide in the presence of a suitable solvent or diluent such as benzene. The reaction mixture is heated for several hours preferably at reflux. After the reaction is completed, the reaction mixture is filtered, washed with water, dried, and the solvent distilled off in vacuo to recover the crude product as the residue. This crude product is often sufficiently pure for use in the method of the present invention as such, or if desired can be purified by means common to the art such as chromatography.

The manner in which the compounds useful in the method of this invention can be prepared is illustrated in the following examples:

*Example 1*

Potassium salt of dimethyldithiophosphate (6.0 g.), benzene (100 ml.), and N-methoxy-N-isopropyl-α-chloroacetamide (4.1 g.) were placed in a 250 ml. three-necked, round-bottom flask equipped with a mechanical stirrer and a reflux condenser. The reaction mixture was heated to, and maintained at reflux with stirring for about 16 hours. The reaction mixture was cooled and filtered. Benzene was removed from the filtrate in vacuo yielding a cloudy oil, which was dissolved in diethyl ether, and the ether solution washed twice with water, dried over anhydrous magnesium sulfate, filtered, and the ether evaporated by placing the filtrate in vacuo for about 16 hours. The oil remaining after the ether was evaporated was filtered to yield the compound of the formula

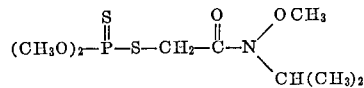

as a light yellow oil having an index of refraction at 28° C. of $n_D = 1.5161$ and the following elemental analysis.—Calculated for $C_8H_{18}NO_4S_2P$: Theoretical, percent, S, 22.30; P, 10.80. Found, percent, S, 22.61; P, 11.33.

*Example 2*

Potassium salt of dimethyldithiophosphate (6.0 g.), benzene (100 ml.), and N-methoxy-N-n-propyl-α-chloroacetamide (4.0 g.) were placed in the flask described in Example 1. The reaction mixture was heated and stirred at reflux for about 16 hours, cooled and filtered. Benzene was evaporated from the filtrate in vacuo, yielding an oil which was dissolved in diethyl ether, and the ether solution washed twice with water, dried over anhydrous magnesium sulfate and filtered. Diethyl ether was evaporated from the solution in vacuo over a period of about 16 hours. The residual oil was filtered to yield as the filtrate the compound of the formula

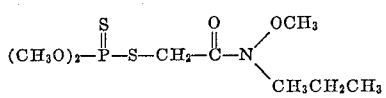

as a light yellow oil having an index of refraction at 27.5° C. of $n_D = 1.5186$ and the following elemental analysis.— Calculated for $C_8H_{18}NO_4S_2P$: Theoretical, percent S, 22.30; P, 10.80. Found, percent S, 23.48; P, 11.47.

*Example 3*

Potassium salt of diethyl dithiophosphate (11 g.), benzene (100 ml.), and N-methoxy-N-methyl-α-chloroacetamide (4.0 g.) were placed in the flask described in Example 1, and heated and stirred at reflux for about 16 hours. The reaction mixture was cooled and filtered and benzene removed from the filtrate by evaporation in vacuo. The residual oil was dissolved in diethyl ether and the ethereal solution washed twice with water, dried over anhydrous magnesium sulfate, and filtered. Diethyl ether was evaporated from the ethereal solution in vacuo over a period of about 9 hours. The residual oil was filtered several times to yield the compound of the formula

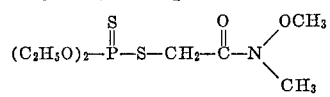

as a yellow oil having the following elemental analysis.— Calculated for $C_8H_{18}NO_4S_2P$: Theoretical, percent S, 22.30; P, 10.80. Found, percent S, 22.60; P, 10.81.

*Example 4*

Sodium salt of dimethyl dithiophosphate (19.8 g.), water (30 g.), acetone (5 g.), and N-acetoxy-N-methyl-α-chloroacetamide (16.5 g.) are stirred at 25–30° C. for about 16 hours. The reaction mixture is filtered, and the organic layer of the filtrate separated from the aqueous layer, washed with 10% aqueous potassium carbonate solution and then with water, dried over anhydrous magnesium sulfate, filtered from the drying agent and heated in vacuo to yield the compound of the formula

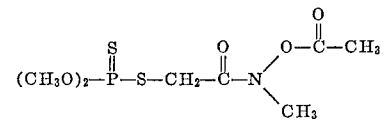

A wide variety of other compounds useful in the method of the present invention can be prepared in a manner similar to that detailed in the previous examples. In the following examples are given the starting materials which can be used to prepare the indicated named compounds.

Example 5

Potassium salt of diethyl dithiophosphate+N-methoxy-N-isopropyl-α-chloroacetamide=

$$(C_2H_5O)_2-\overset{S}{\underset{\|}{P}}-S-CH_2-\overset{O}{\underset{\|}{C}}-N\overset{OCH_3}{\underset{CH(CH_3)_2}{\diagdown}}$$

Example 6

Potassium salt of dipropyl dithiophosphate+N-methoxy-N-isopropyl-α-chloroacetamide=

$$(C_3H_7O)_2-\overset{S}{\underset{\|}{P}}-S-CH_2-\overset{O}{\underset{\|}{C}}-N\overset{OCH_3}{\underset{CH(CH_3)_2}{\diagdown}}$$

Example 7

Potassium salt of dimethyl dithiophosphate+N-isopropoxy-N-isopropyl-α-chloroacetamide=

$$(CH_3O)_2-\overset{S}{\underset{\|}{P}}-S-CH_2-\overset{O}{\underset{\|}{C}}-N\overset{OCH(CH_3)_2}{\underset{CH(CH_3)_2}{\diagdown}}$$

Example 8

Potassium salt of dimethyl dithiophosphate+N-isopropoxy-N-methyl-α-chloroacetamide=

$$(CH_3O)_2-\overset{S}{\underset{\|}{P}}-S-CH_2-\overset{O}{\underset{\|}{C}}-N\overset{OCH(CH_3)_2}{\underset{CH_3}{\diagdown}}$$

Example 9

Potassium salt of dimethyl dithiophosphate+N-n-propoxy-N-methyl-α-chloroacetamide=

$$(CH_3O)_2-\overset{S}{\underset{\|}{P}}-S-CH_2-\overset{O}{\underset{\|}{C}}-N\overset{OCH_2CH_2CH_3}{\underset{CH_3}{\diagdown}}$$

Example 10

Sodium salt of didecyl phosphate+N-n-butoxy-N-methy-α-chloroacetamide=

$$(C_{10}H_{21}O)_2-\overset{O}{\underset{\|}{P}}-O-CH_2-\overset{O}{\underset{\|}{C}}-N\overset{OC_4H_9}{\underset{CH_3}{\diagdown}}$$

Example 11

Sodium salt of O-ethyl-O-methyl thionophosphate+N-Methoxy-N-nonyl-α-chloroacetamide=

$$\overset{C_2H_5O}{\underset{CH_3O}{\diagdown}}\overset{S}{\underset{\|}{P}}-O-CH_2-\overset{O}{\underset{\|}{C}}-N\overset{OCH_3}{\underset{C_9H_{19}}{\diagdown}}$$

Example 12

Sodium salt of S,S-dimethylthio phosphate+N-Ethoxy-N-n-propyl-β-bromopropionamide=

$$(CH_3S)_2-\overset{O}{\underset{\|}{P}}-O-CH_2-CH_2-\overset{O}{\underset{\|}{C}}-N\overset{OC_2H_5}{\underset{C_3H_7}{\diagdown}}$$

Example 13

Sodium salt of P,P-diethyl thiophosphonic acid+N-methoxy-N-octyl-α-chloroacetamide=

$$(C_2H_5)_2-\overset{O}{\underset{\|}{P}}-S-CH_2-\overset{O}{\underset{\|}{C}}-N\overset{OCH_3}{\underset{C_8H_{17}}{\diagdown}}$$

Example 14

Sodium salt of diethyl dithiophosphate+N-isopropoxy-N-methyl-α-chloroacetamide=

$$(C_2H_5O)_2-\overset{S}{\underset{\|}{P}}-S-CH_2-\overset{O}{\underset{\|}{C}}-N\overset{OCH(CH_3)_2}{\underset{CH_3}{\diagdown}}$$

Example 15

Sodium salt of P,P-dicyclohexylphosphonic acid+N-Isopropoxy-N-methyl-β-bromopropionamide=

$$(C_6H_{11})_2-\overset{O}{\underset{\|}{P}}-O-CH_2-CH_2-\overset{O}{\underset{\|}{C}}-N\overset{OCH(CH_3)_2}{\underset{CH_3}{\diagdown}}$$

Example 16

Sodium salt of dicyclopentyl dithiophosphate+N-Methoxy-N-isopropyl-α-chloroacetamide=

$$(C_5H_9O)_2-\overset{S}{\underset{\|}{P}}-S-CH_2-\overset{O}{\underset{\|}{C}}-N\overset{OCH_3}{\underset{CH(CH_3)_2}{\diagdown}}$$

Example 17

Sodium salt of dibenzyl dithiophosphate+N-Methoxy-N-isopropyl-β-bromopropionamide=

$$(C_6H_5-CH_2-O)_2-\overset{S}{\underset{\|}{P}}-S-CH_2-CH_2-\overset{O}{\underset{\|}{C}}-N\overset{OCH_3}{\underset{CH(CH_3)_2}{\diagdown}}$$

For practical use as pre-emergence herbicides, the compounds of this invention are generally incorporated into herbicidal compositions which comprise an inert carrier and a herbicidally toxic amount of such a compound. Such herbicidal compositions, which are usually known in the art as formulations, enable the active compound to be applied conveniently to the site of the soil to be treated in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the soil to be treated. The emulsifiers most commonly used in these concentrates are nonionic or mixtures of nonionic with anionic surface-active agents.

The concentration of the heretofore described compounds in the herbicidal compositions utilized in the method of the present invention will vary greatly with the type of formulation and the purpose for which it is designed, but generally the herbicidal compositions will comprise from about 0.05 to about 95 percent by weight of the active compound. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perrenial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The compounds utilized in the method of this invention are particularly valuable for pre-emergence weed control because they are toxic to many species and groups of weed seeds while they are relatively nontoxic to many beneficial crop seeds and plants. While compounds of the class useful in the method of this invention have been disclosed in U.S. Patent 3,092,541, this patent does not disclose the use of these compounds for preemergent treatments. This patent is directed to combating insects and acarids.

The method of this invention for the control of weeds comprises applying to the soil containing weed seeds and unemerged seedlings, a herbicidal composition comprising an inert carrier and as the essential active ingredient, in a quantity which is herbicidally toxic to said weed seeds and/or unemerged seedlings, a compound as described herein. Application of the herbicidal composition is preferably made to the soil at or before the time of planting or between planting and the emergence of desirable plants. Where the soil is to be treated between planting and emergence of desirable plants, it is preferred to plant the seeds of desirable plants below the zone of the weed seeds. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds under adverse conditions, the application of one pound or more of active compound per acre may be required for good control of a dense infestation of hardy weed seeds under favorable conditions.

Some typical herbicidal compositions which can be used in the method of this invention are shown in the following examples, in which all quantities given are in parts by weight.

*Example 18.—Preparation of an emulsifiable concentrate*

The following ingredients are blended thoroughly until a homogenous liquid concentrate is obtained. This concentrate is mixed with water to give an aqueous dispersion containing the desired concentration of active compound for use as a spray.

Product of Example 1 _____ 25
Sodium lauryl sulfate _____ 2
Sodium lignin sulfonate _____ 3
Kerosene _____ 70

*Example 19.—Preparation of a wettable powder*

The following components are mixed intimately in conventional mixing or blending equipment and are then ground to a powder having an average particle size of less than about 50 microns. The finished powder is dispersed in water to give the desired concentration of active compound.

Product of Example 2 _____ 75.00
Fuller's earth _____ 22.75
Sodium lauryl sulfate _____ 2.00
Methyl cellulose _____ .25

*Example 20.—Preparation of an oil-dispersible powder*

The following components are blended and ground as described in the previous example to give a powder which can be dispersed in oil to form a spray containing the desired concentration of active compound Product of Example 3 _____ 70
Condensation product of diamylphenol with ethylene oxide _____ 4
Fuller's earth _____ 26

*Example 21.—Preparation of a dust*

The following ingredients are mixed thoroughly and then ground to an average particle size of less than about 50 microns to give a dust suitable for application with conventional dusting equipment.

Product of Example 1 _____ 10
Talc _____ 90

*Example 22.—Preparation of a granular formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

Product of Example 2 _____ 10
Fuller's earth _____ 66
Dextrin _____ 20
Sodium lignin sulfonate _____ 3
Kerosene _____ 1

The herbicidal method of the present invention was illustrated, for example, by a number of experiments carried out for the pre-emergence control of crabgrass. Crabgrass is a term used to describe a group of summer annuals which cause extensive damage to lawns, turf, and other grassy areas. The crabgrass kills by taking moisture and nutrients from the soil and thus smothering and choking the desirable grasses. The grasses around each crabgrass plant are usually killed or seriously weakened. When the crabgrass dies, it leaves bare spots, liberally sprinkled with enough seeds to provide serious infestation the next season. The two species of crabgrass which are the most widespread weed pests of lawns are *Digitaria ischaemum*, commonly known as smooth crabgrass, and *Digitaria sanguinalis*, usually known as common, large, hairy, tall, purple, fingergrass, turkeyfoot, crowfoot grass, and watergrass. At least fifteen other varieties of *Digitaria* species of crabgrass are known. Also generally classified with crabgrass are such weeds as goosegrass (*Eleusine Indica*), broomsedge (*Andropogon virginicus*), pigeon grass or green bristle grass (*Setaria viridis*), yellow bristle grass (*Setaria lutescens*), watergrass (*Echinochloa crusgalli*), witchgrass (*Punicum capillare*), cheatgrass or chess (*Bromus secalinus*), and downy bromegrass (*Bromus tectorum*).

The utility of the method of this invention in controlling weeds can be demonstrated by a variety of testing techniques known to the art. In one series of experiments, test compounds, formulated as aqueous emulsions of acetone solutions containing emulsifiers, were sprayed at various dosages on the surface of soil which had been seeded less than twenty-four hours earlier with seeds of crop plants and weeds. After spraying, the soil containers were placed in the greenhouse and provided with supplementary light and heat as required and daily or more frequent watering. The type and severity of injury to each crop and weed were determined 15 and 20 days after the soil treatments. The severity of injury was rated on a scale of from 0 to 10, with 0 denoting no injury and 10 denoting total death of the plant. In these experiments, the method of the present invention using the heretofore described compounds listed below at the given dosages as compared to identical applications of 2,4-D at the given concentration, and control plots treated with the same formulations without the essential active compounds.

INJURY RATINGS

| Test Plant | Product of Example 1 | | | Product of Example 2, 2 lb. per acre | 2,4-D, 2 lb. per acre | Control |
|---|---|---|---|---|---|---|
|  | ½ lb. per acre | 1 lb. per acre | 2 lb. per acre |  |  |  |
| Weed Species: |  |  |  |  |  |  |
| Crabgrass | 9 | 9 | 9 | 9 | 5 | 0 |
| Foxtail | 9 | 9 | 9 | 9 | 5 | 0 |
| Ryegrass | 7 | 9 | 8 | 3 | 0 | 0 |
| Barnyard grass | 9 | 9 | 9 | 9 | 3 | 0 |
| Beneficial Plant: |  |  |  |  |  |  |
| Wheat | 0 | 1 | 0 | 0 | 3 | 0 |
| Safflower | 0 | 1 | 0 | 0 | 8 | 0 |
| Soybeans | 0 | 1 | 1 | 0 | 3 | 0 |
| Cotton | 0 | 0 | 0 | 0 | 5 | 0 |

These results are particularly significant in view of the fact that the method of the present invention provides for the control of a number of weed species at small dosages of active compounds not effectively controlled by most presently used herbicides such as 2,4-D, at the same dosages while providing unusual and unexpected safety to many beneficial crop plants not provided by the use of many presently used herbicides. The above experiments demonstrate that the method of the present invention is particularly effective in the control of grassy weeds, and hence the control of such weeds is a particularly preferred embodiment of the present invention. Moreover, as the above experiments illustrate, excellent control of undesirable plant life can be obtained by applying a maximum of about one pound of active compound per acre of soil, and equally good control is often obtained by applying a maximum of about one-half pound of active compound per acre.

I claim:

1. A method for the pre-emergence control of undesirable plant life which comprises applying to soil a herbicidal composition comprising an inert carrier and as the essential active ingredient, in a quantity which is herbicidally injurious to said undesirable plant life, a compound of the formula

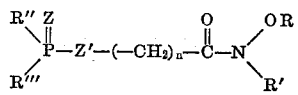

wherein R and R' are independently selected from the group consisting of alkyl and acyl groups containing from one to ten carbon atoms; $n$ is an integer from 1 to 3; Z and Z' are independently selected from the group consisting of oxygen and sulfur; and R'' and R''' are independently selected from the group consisting of alkyl, cycloalkyl, alkoxy, cycloalkoxy, alkylthio, aryl, aryloxy, arylthio, aralkyl, aralkoxy and aralkylthio groups containing from one to eighteen carbon atoms.

2. A method for the pre-emergence control of undesirable plant life which comprises applying to soil containing weed seeds a herbicidal composition comprising an inert carrier and as the essential active ingredient, in a quantity which is herbicidally injurious to said undesirable plant life, a compound of the formula

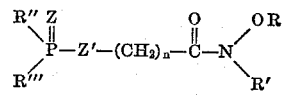

wherein R and R' are independently selected from the group consisting of alkyl and acyl groups containing from one to ten carbon atoms; $n$ is an integer from 1 to 3; Z and Z' are independently selected from the group consisting of oxygen and sulfur; and R'' and R''' are independently selected from the group consisting of alkyl, cycloalkyl, alkoxy, cycloalkoxy, alkylthio, aryl, aryloxy, arylthio, aralkyl, aralkoxy, and aralkylthio groups containing from one to eighteen carbon atoms.

3. A method for the pre-emergence control of weeds which comprises applying to soil containing weed seeds a herbicidal composition comprising an inert carrier and as the essential active ingredient, in a quantity which s toxic to said weed seeds, a compound of the formula

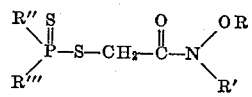

wherein R and R' are alkyl groups containing from one to six carbon atoms, provided that a minimum of one of R and R' contains at least two carbon atoms; and R'' and R''' are alkyl groups containing from one to ten carbon atoms.

4. The method of claim 1, wherein the compound

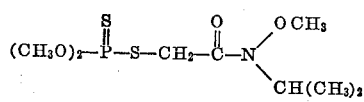

5. The method of claim 1, wherein the compound

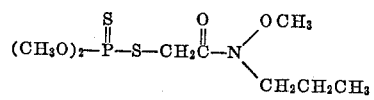

6. The method of claim 1, wherein the compound

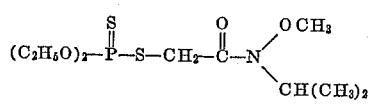

7. The method of claim 1, wherein the compound

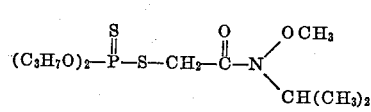

8. The method of claim 1, wherein the compound

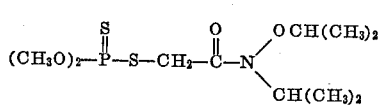

9. The method of claim 1, wherein the compound
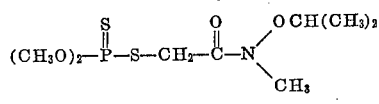
10. The method of claim 1, wherein the compound
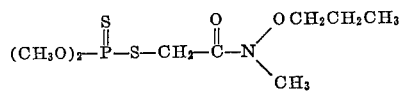
References Cited
UNITED STATES PATENTS
3,092,541   6/1963   Beriger _____ 167—30
3,102,023   8/1963   Speziale et al. _____ 71—2.7
LEWIS GOTTS, *Primary Examiner.*
JAMES O. THOMAS, JR., *Examiner.*

UNITED STATES PATENT OFFICE
CERTIFICATE OF CORRECTION

Patent No. 3,350,192                              October 31, 1967

Sidney B. Richter

It is hereby certified that error appears in the above numbered patent requiring correction and that the said Letters Patent should read as corrected below.

Column 1, lines 18 to 21, for the right-hand portion of the formula reading:

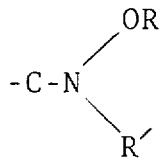          read          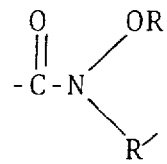

same column 1, lines 36 to 39, and column 9, lines 50 to 54, for that portion of each formula reading

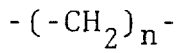          read          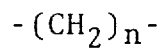

column 2, line 61, for "sudfur" read -- sulfur --; column 3, line 34, for "or", first occurrence, read -- of --; column 4, lines 29 to 31, for that portion of the formula reading

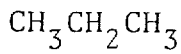          read          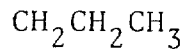

column 5, lines 40 to 42, for that portion of the formula reading

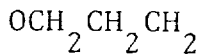          read          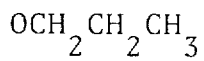

column 10, line 30, for "s" read -- is --; same column 10, lines 43, 50, 57, 63 and 70, and column 11, lines 1 and 6, after "compound", each occurrence, insert -- is --.

Signed and sealed this 10th day of December 1968.

(SEAL)
Attest:

EDWARD M. FLETCHER, JR.                  EDWARD J. BRENNER
Attesting Officer                         Commissioner of Patents